US007483165B2

(12) United States Patent
Ahne et al.

(10) Patent No.: US 7,483,165 B2
(45) Date of Patent: Jan. 27, 2009

(54) USER-SELECTABLE FUNCTIONS FOR USE IN OUTPUT DEVICES TO GENERATE BACKGROUND IMAGES

(75) Inventors: Adam J. Ahne, Lexington, KY (US); Mark J. Edwards, Lexington, KY (US); Brian K. Owens, Lexington, KY (US); Ricky E. Robbins, Danville, KY (US)

(73) Assignee: Lexmark International, Inc., Lexington, KY (US)

( * ) Notice: Subject to any disclaimer, the term of this patent is extended or adjusted under 35 U.S.C. 154(b) by 920 days.

(21) Appl. No.: 10/809,141

(22) Filed: Mar. 25, 2004

(65) Prior Publication Data
US 2005/0213162 A1 Sep. 29, 2005

(51) Int. Cl.
G06F 15/00 (2006.01)
G06K 1/00 (2006.01)
G06K 15/00 (2006.01)
H04N 1/40 (2006.01)

(52) U.S. Cl. .................................. 358/1.18; 358/3.28
(58) Field of Classification Search ............. 348/207.1, 348/207.11, 231.2, 232.2; 715/530; 382/276, 382/286, 305; 358/1.16, 1.17, 1.9, 1.1, 462, 358/540, 1.18
See application file for complete search history.

(56) References Cited

U.S. PATENT DOCUMENTS

| 5,920,685 | A | 7/1999 | Romano et al. |
|---|---|---|---|
| 6,339,478 | B1 | 1/2002 | Kawasaki |
| 6,463,481 | B1 | 10/2002 | Lupien, Jr. et al. |
| 6,556,243 | B1* | 4/2003 | Dotsubo et al. .......... 348/231.2 |
| 6,826,551 | B1* | 11/2004 | Clary et al. .................... 706/46 |
| 7,098,942 | B1* | 8/2006 | Nihei .................... 348/207.99 |
| 7,149,347 | B1* | 12/2006 | Wnek .......................... 382/159 |
| 2001/0012377 | A1 | 8/2001 | Rhoads |
| 2002/0018233 | A1* | 2/2002 | Mori .......................... 358/1.15 |
| 2002/0076081 | A1 | 6/2002 | Rhoads |
| 2002/0144257 | A1 | 10/2002 | Matsushima |
| 2003/0059083 | A1 | 3/2003 | Umeda et al. |
| 2003/0067631 | A1 | 4/2003 | Kinjo |
| 2003/0102660 | A1 | 6/2003 | Rhoads |
| 2003/0159114 | A1 | 8/2003 | Nishikawa et al. |
| 2003/0202697 | A1 | 10/2003 | Simard et al. |
| 2004/0218206 | A1* | 11/2004 | Schinner .................... 358/1.15 |
| 2005/0174462 | A1* | 8/2005 | Brost .................... 348/333.09 |

* cited by examiner

*Primary Examiner*—Edward L Coles
*Assistant Examiner*—James A Thompson (57) ABSTRACT

User-selectable functions for use in output devices to generate background images. One embodiment of the invention provides an image capture and printing device for creating a scanned image of an item or an original image. The device includes a user interface configured to present a plurality of capture-to functions and to receive input from a user indicating a selection of at least one of the plurality of capture-to functions; an image capturer configured to capture an image, where the size, shape, or intensity of the image, or a combination thereof is based upon the selected capture-to function; and a print engine configured to print the captured image as a background layer in a copy.

38 Claims, 7 Drawing Sheets

USER-SELECTABLE FUNCTIONS FOR USE IN OUTPUT DEVICES TO GENERATE BACKGROUND IMAGES

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to printers and multi-function devices that have some combination of scanning, facsimile, and printing capabilities. These devices may operate in a stand-alone manner, but are often used as peripherals for computers. More specifically, embodiments of the invention relate to such devices that are configured to produce background images.

2. Description of the Related Art

There are a variety of existing printers and devices that have some combination of scanning, facsimile, printing, and other capabilities. The latter devices are often referred to as multi-function or all-in-one ("AIO") devices. Some existing devices have capabilities that allow a user to print background indicia in copies of documents or other content printed by the devices. For example, in some devices it is possible to print a word such as "DRAFT" or "CONFIDENTIAL" on all copies of a document. In some instances, a word may appear in the background in a manner that is similar in appearance to a watermark.

SUMMARY OF THE INVENTION

Although devices such as the ones described above exist, relatively few, multi-function devices designed for use in the home provide a video graphics display. In addition, the inventors are unaware of devices that allow a user to incorporate images and graphics from an external, user selected source into printed documents. Accordingly, there is a need for improved methods and systems for printing documents with background images or objects.

Some embodiments of the invention provide one or more user-selected functions referred to as a global scan-to function, or more broadly, a global capture-to function, that allows the user to input images to the device to be used for a variety of background images including, watermarks, headers and footers, borders and frames, fax cover sheets, and other applications.

In one embodiment, the invention provides an image capture and printing device for creating a scanned image of an original image. The device contains a user interface configured to present a plurality of global, capture-to functions and to receive input from a user indicating a selection of at least one of the plurality of global, capture-to functions. The device also provides an image capturer configured to capture an image and an image processor configured to process the image by adjusting the image's size, shape, or intensity, or a combination thereof, based upon the selection of the user, to produce a processed image. Finally, the device includes a print engine configured to print the processed image as a background layer in a copy that includes at least part of the captured image.

In another embodiment, the invention provides a method for producing a background layer from a scanned image. The method includes providing a user interface configured to present a plurality of global, capture-to functions; receiving input from a user indicating a selection of at least one of the plurality of global, capture-to functions; capturing an image; processing the image by adjusting the image's size, shape, and intensity or a user-selected combination thereof, to produce a processed image; and placing the processed image in a background layer of another image that includes at least part of the captured image.

Other features and advantages of the invention will become apparent to those skilled in the art upon review of the following detailed description, claims, and drawings.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
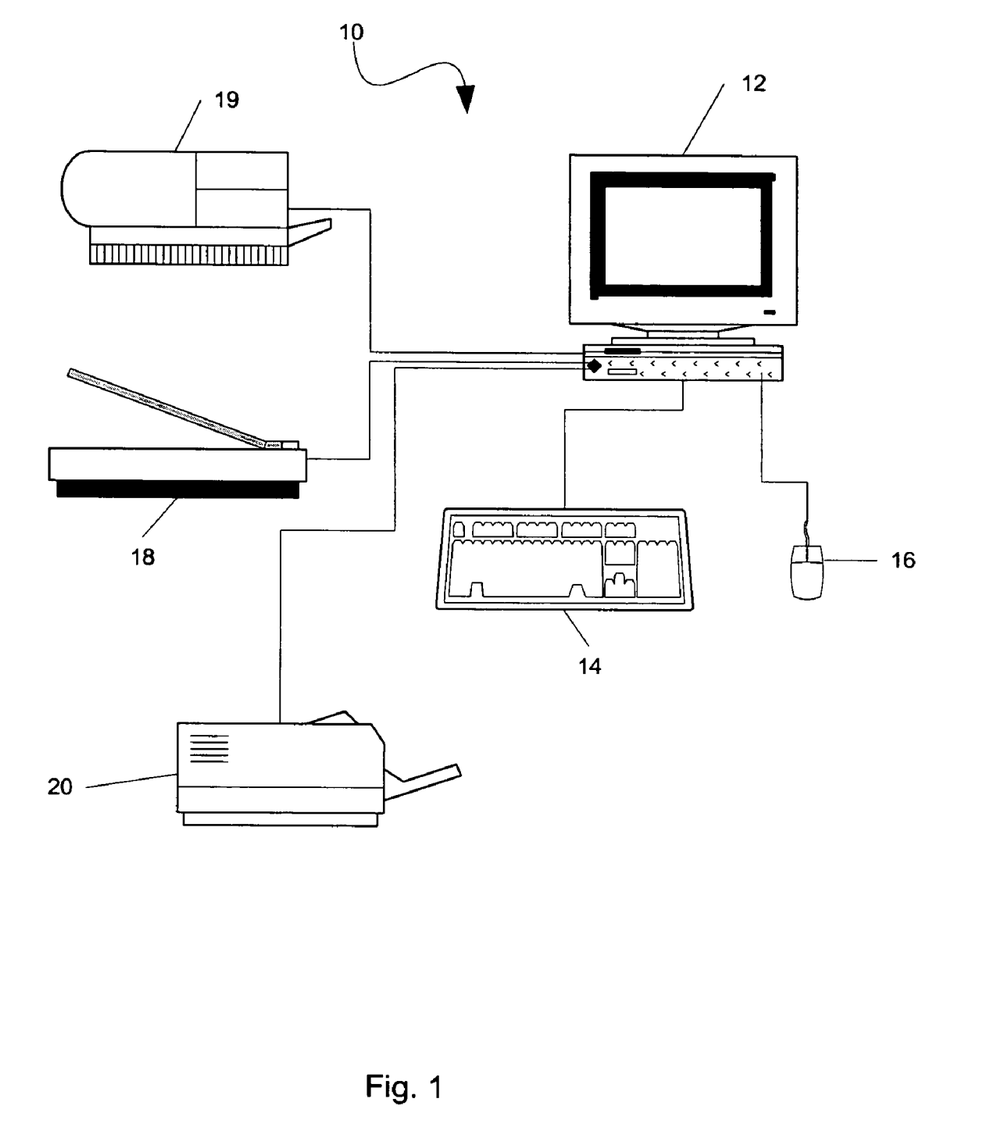
FIG. 1 is an illustration of an exemplary computer system including a workstation connected to a number or peripherals.

FIG. 1 illustrates an exemplary computer system 10. The system 10 includes a workstation 12 having a keyboard 14 and cursor control device 16, which is shown in the form of a mouse. The workstation 12 is connected to a scanner 18, a printer 19, and a multi-function device 20. The multi-function device 20 may be an AIO device as described above. Alternatively, the multi-function device 20 may be a device that combines only printing and scanning functionality and no other. In addition, although shown as a peripheral connected to the workstation 12, the multi-function device 20 could operate as a stand-alone device. For example, using the scanning functionality of the multi-function device 20, a user could scan an image into the memory (discussed below) of the multi-function device 20 and then print multiple copies of that image using the printing components of the device 20. None of these acts would require interaction with the workstation 12. As should also be apparent, the system 10 could be configured to include multiple workstations, scanners, multi-function devices, and other devices not shown. Routers, switches, or network connections allowing the scanners, multi-function devices, and other components to communicate with the multiple workstations could also be included. In addition, the various connections between elements of the system 10 could include both wired and wireless connections as well as local area network and wide area network connections.

Figure 2:
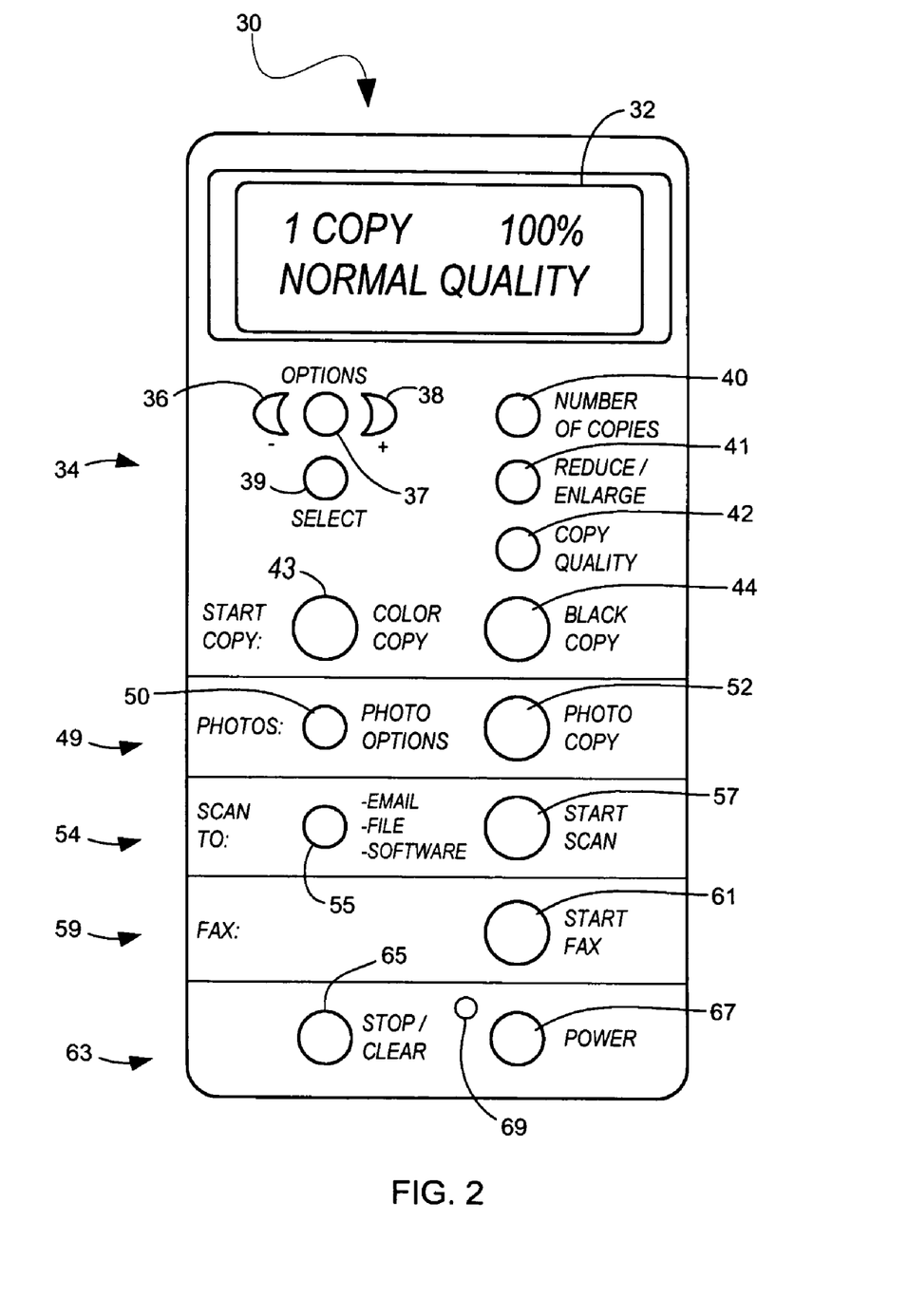
FIG. 2 is an illustration of an exemplary user interface that is suitable for use in one of the peripherals of FIG. 1.

FIG. 2 illustrates an interface or operator panel 30 for the multi-function device 20. The operator panel 30 includes a graphical display 32, and a keypad 34 having a variety of input buttons. The keypad 34 includes a cursor control portion having a decrement or left arrow button 36, an options button 37, an increment or right arrow button 38, and a select button 39. The keypad 34 also includes a number of copies button 40, a reduce/enlarge button 41, and a copy quality button 42. In addition, the keypad 34 includes two start copy buttons: a color copy button 43 and a black and white copy button 44.

The keypad 34 also includes a photo control section 49 having a photo options button 50 and a photo copy button 52. Adjacent the photo control section 49 is a scanning control section 54 having a destination selection button and 55 and a start capture button 57. Finally, the keypad 34 includes a fax control section 59 with a start fax button 61 and a device control section 63 having a stop/clear button 65 and a power button 67 with an indicator LED 69.

In the example shown in FIG. 2, the graphical display 32 is a 2 line by 16 characters/line alphanumeric panel. Graphical displays of different sizes, particularly larger displays, could be used in place of the display shown. In one embodiment, the multi-function device 20 may be configured such that, at power up, the display 32 generates a default message such as the following:

| B | L | A | N | K |   | P | A | P | E | R |   | S | I | Z | E |
|---|---|---|---|---|---|---|---|---|---|---|---|---|---|---|---|
| ◄ | L | e | g | a | L |   |   |   |   |   |   |   |   |   | ► |

In the discussion that follows, reference will be made to the exemplary display on the graphical display 32 based on the following key:

The left arrow character, ◄, will be represented with a left arrow, <;

The right arrow character, ►, will be represented with a right arrow, >;

A double slash, //, is used to indicate a division of the text on line 1 of the 2 line display from the text on line 2 of the exemplary display; and Left and right brackets, [and], surround any variable value in the menu setting. For example, the default message shown above may, using the key above, be written as:

"BLANK PAPER SIZE //<LegaL*>"

If a user pushes or selects the destination selection button 55 in the scanning control section 54, a message is displayed in the graphical display 32 prompting the user to select a destination for images that are scanned when the start capture button 57 (which is labeled as "Start Scan" in FIG. 2) is pressed. When the destination selection button 55 (which is labeled as "E-mail File Software" in FIG. 2) is selected, the graphical display 32 displays the following:

"Scan To: //<[programmed capture-to destination]*>"

where the text in the "programmed capture-to destination" field encompasses the last selected destination. For example, the graphical display could present the following information:

"Scan To: //<WordPad*>"

In one embodiment of the invention, the multi-function device 20 may be configured so that a list of programmed capture-to destination applications is loaded in a menu associated with the destination selection button 55. Loading of the menu may occur, for example, automatically at the time the driver software for the multi-function device is installed on the workstation 12. It is also possible that the list could be manually updated using, for example, interface screens generated by the driver software. Some exemplary destination options that could be included are "E-mail," "File," and "Software." As should be apparent, the "E-mail" option allows a user to designate an e-mail program as a destination. The "File" option allows a user to designate a file as a destination. And, the "Software" option allows the user to designate a program, which may be loaded on the workstation, as a destination. In one embodiment, the "E-mail" option may be a default option.

In addition to the "E-mail," "File," and "Software" options, additional destination options may be provided. These options may be "global" functions. As used herein, "global" means that the selected option or function applies to all situations or jobs. In addition, "global" functions may be referred to as those functions that may be executed when the device 20 is operated in a stand-alone manner. For example, a "Software" destination may be associated with an application program that is available only on the workstation 12. Under such circumstances the "Software" destination is unavailable when the device 20 is operating in a stand-alone mode. Although not a requirement, many of the exemplary "global" functions are not dependent on the device 20 communicating with the workstation 12.

Whether global or not, the additional options may include "Watermark," "Header/Footer," "Border/Frame," and "Fax/Coversheet." As with the "E-mail" and other options discussed above, the additional options are associated with destinations that generally correspond to their names. For example, selection of the "Watermark" option designates a scanned image as one that will be used as a watermark.

Once the driver and the destination menu are loaded, any additional destination options such as those that the user manually enters or those that are automatically downloaded by the installed driver when the multi-function device 20 is connected to a workstation 12 or another device capable of providing additional destination options are included in the destination menu. These additional destinations may be downloaded from the workstation 12 to the device 20 via a string of characters. Additional destination options may include Microsoft Paint, Microsoft Word, Microsoft Excel, and Microsoft PowerPoint software; other drawing, word processing, spreadsheet or presentation programs, clipboard applications; and custom applications.

The left arrow button 36 and right arrow button 38 are used to scroll through or display the destination options. When a desired destination option is displayed on the display 32, the user may activate the select button 39. The destination selection button 55 is disabled when scanning commences and during print jobs. The device 20 may be designed so that pressing the select button 39 causes the graphical display 32 to read:

"Press Start Scan// button to begin"

In one embodiment of the invention, the device 20 may be programmed or otherwise configured to display only those destination options that are available. Thus, for example, when the device 20 is disconnected from the workstation 12 (or operating in stand-alone mode) it may be configured to display only the destination options that are independent of the workstation or other external devices. In one embodiment, these options include the global capture-to destination options.

Unless an error or prohibited condition exists, when the start capture button 57 (labeled as "Start Scan" in FIG. 2) is activated, a scan or capture is initiated. The destination of the data that is captured during the operation is the destination that has been selected by the user from the destination list displayed on the display 32. Generally, the scan is performed in accordance with current scan settings programmed into the device 20. These settings may be default settings set at the time of manufacture or settings modified by the user.

Conditions under which a scan operation might be prohibited include selection of a destination that requires interaction with the workstation 12 or other external devices when the device 20 is operating in a stand-alone mode. The device 20 may be configured such that when a prohibited or error condition occurs an appropriate error message is displayed. For example, if a user presses the start capture button 57 in a case where an application on the workstation 12 is the destination and the device 20 is disconnected from the workstation or the workstation is not on, an error message such as "Computer // not connected>"

may be displayed on the graphical display 32.

Figure 3:
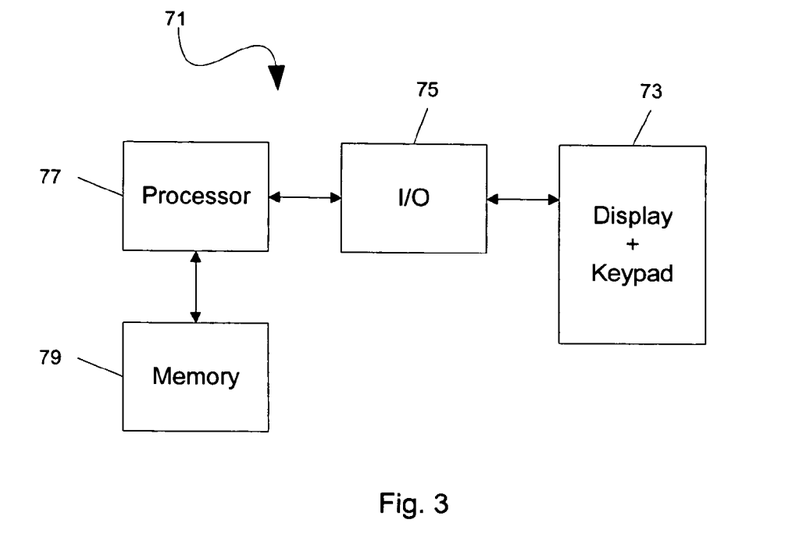
FIG. 3 is a schematic diagram of hardware inside one of the peripherals shown in FIG. 1.

FIG. 3 illustrates hardware 71 that may be used in the multi-function device 20 or another peripheral such as the scanner 18 or printer 19. In the exemplary configuration shown, the hardware 71 includes a display and keyboard module 73, an I/O module 75, a processor 77, and a memory module 79. The memory module 79 may contain non-volatile memory such as one or more forms of ROM, RAM or media cards, one or more disk drives, other memory, or combinations of the foregoing.

Figure 4:
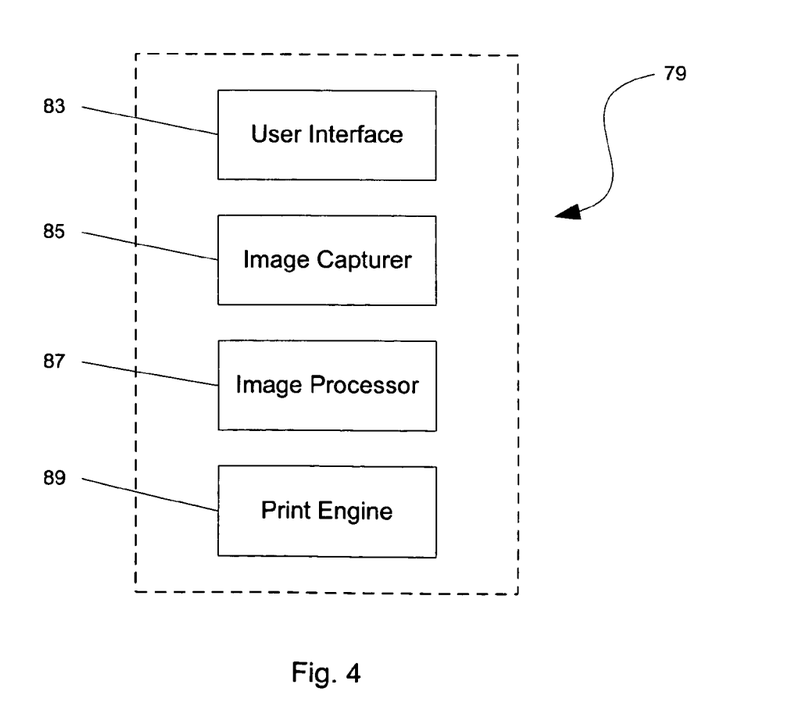
FIG. 4 is a schematic diagram illustrating software that may be stored in the memory illustrated in FIG. 3.

FIG. 4 illustrates the possible contents of the memory module 79 or a portion thereof. As illustrated in FIG. 4, the memory module 79 contains software. The software is illustrated as having four portions: a user interface 83, an image capturer 85, an image processor 87, and a print engine 89. In various implementations, the software may be configured in such a way that it does not include four distinct portions. Functional features could be combined in a variety of ways. However, in at least some embodiments, the user interface 83 includes instructions for generating output on the display 32, the image capturer 85 includes instructions for capturing data from a capture device such as an array of charge-coupled devices ("CCD") or contact image sensor ("CIS") or the like. The image processor 87 may include instructions for processing image data such as combining foreground and background images and the print engine 89 may include instructions for converting data into a format that is suitable for use by a printer. The memory module 79 is not limited to the components listed and may contain other applications and data used to support the multi-function device 20. Software used in devices such as the device 20, scanner 18, and printer 19 to carry out basic operations such as scanning, printing, and faxing is well known and, therefore, not described.

Figure 5:
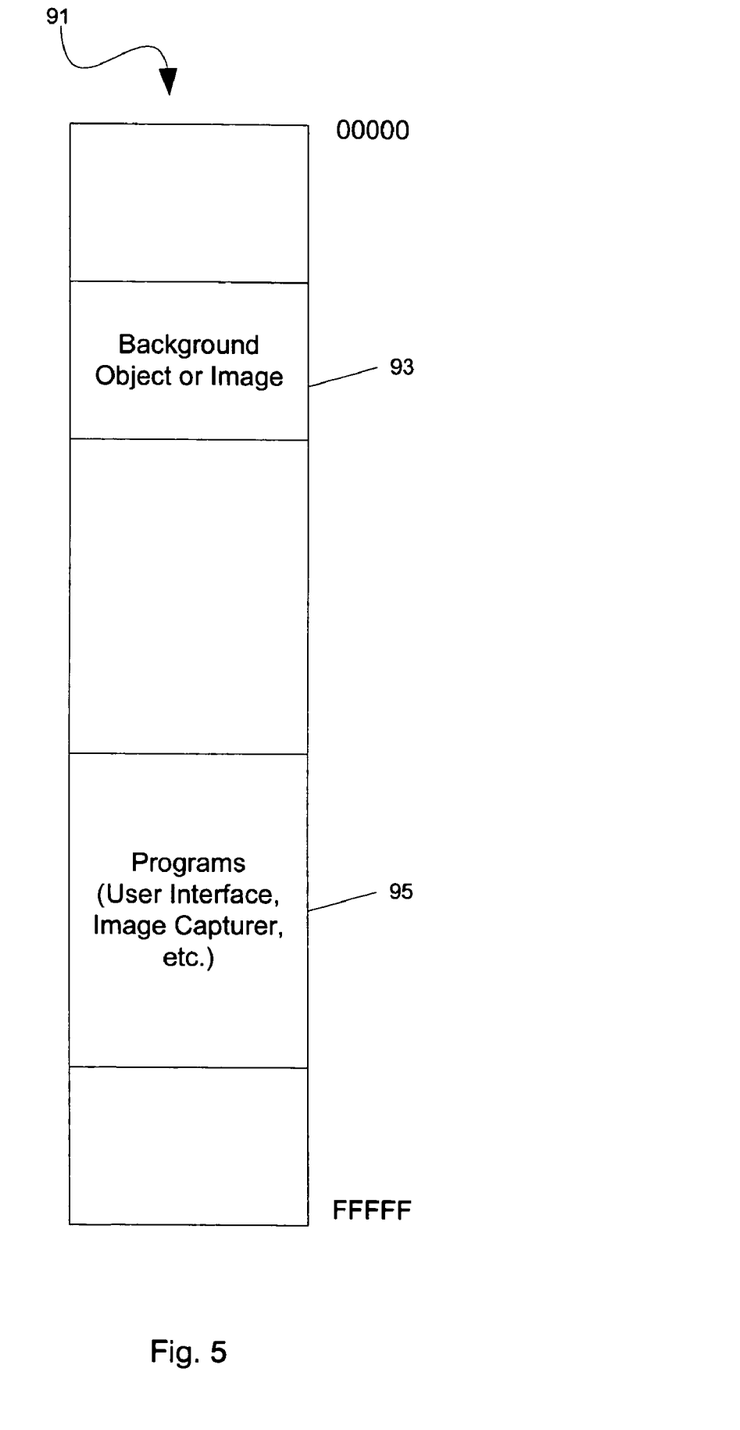
FIG. 5 is a diagram of non-volatile memory, which may be part of the memory illustrated in FIG. 4, illustrating that a portion of the non-volatile memory may be used to store a background object or image.

FIG. 5 represents a diagram of a non-volatile memory portion 91 of the memory module 79. The memory portion 91 contains locations for varying types of stored data. A background section 93 holds background objects or images and a program section 95 holds application programs such as the user interface 83, the image capturer 85, the image processor 87, and the print engine 89. The memory module 79 may contain more designated sections to store data although it is not required.

Figure 6:
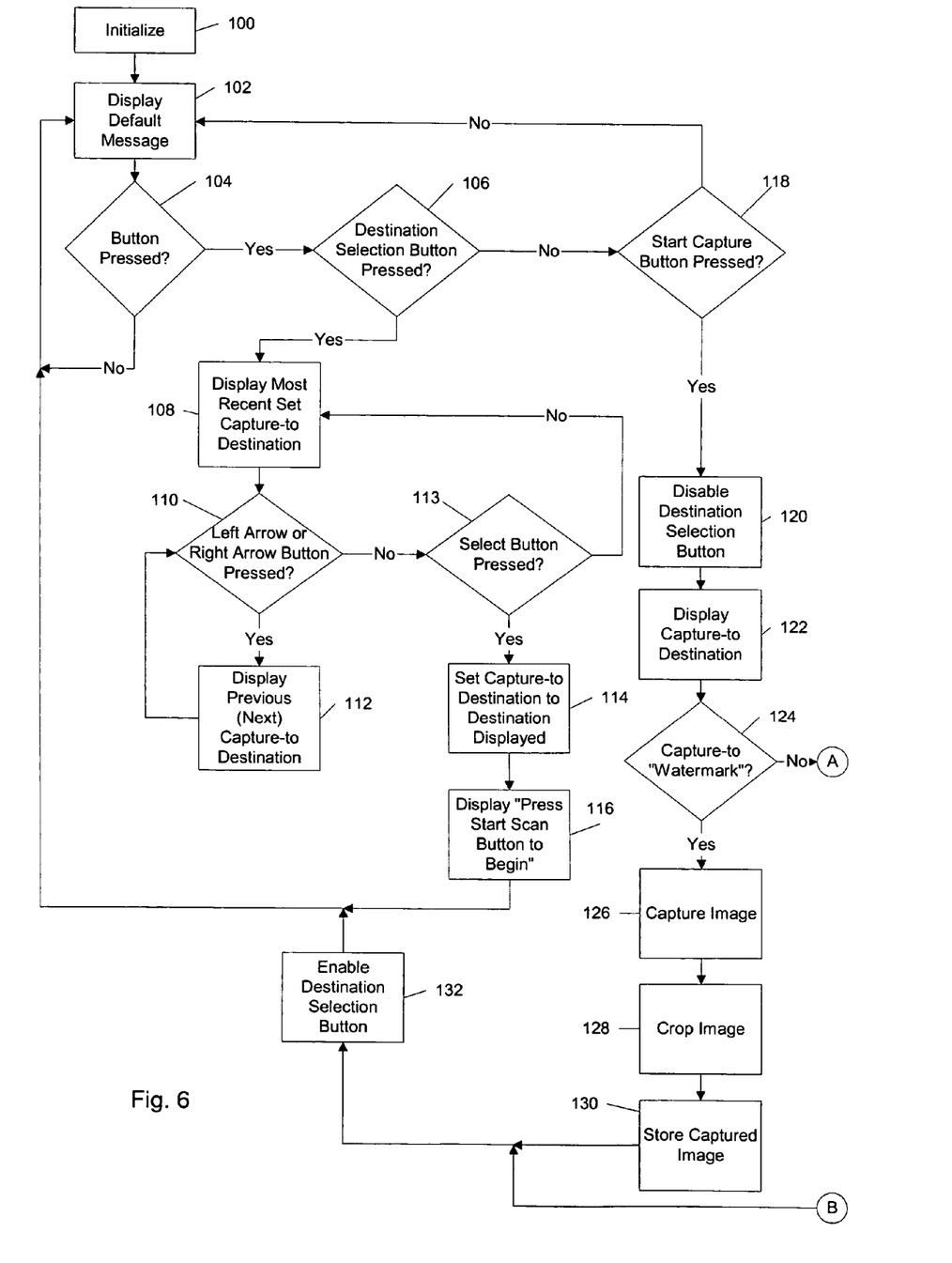
FIG. 6 and FIG. 6A, taken together, constitute a flow chart diagramming a process of selecting capture-to function options displayed on the interface shown in FIG. 2.
Figure 6A:
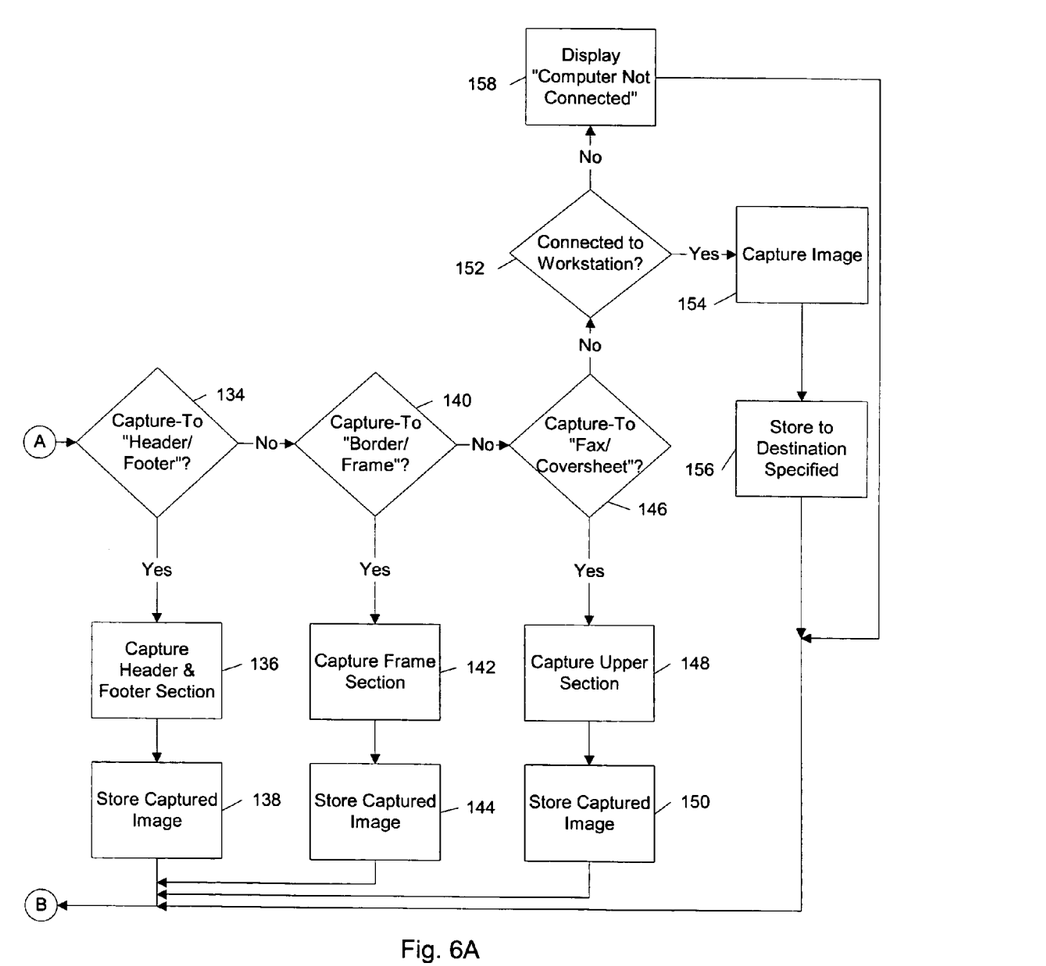

FIG. 6 and FIG. 6A illustrate an exemplary background data or image capture process carried out by the device 20 when a user selects a global capture-to function. As may be seen by referring to FIG. 6, the process begins at block 100 where any required hardware and software initializations are performed to calibrate and prepare the system for use. The graphical display 32 is initially in a default condition, as shown in block 102. The processor 77 (executing the software described above) periodically queries or scans the operator panel 30 to determine whether a button is pressed or selected (block 104). If a button is not selected, the processor 77 continues to display the default screen on the graphical display 32 (block 102). If a button is selected, the processor 77 determines whether the destination selection button 55 is pressed (block 106). If the destination selection button 55 is pressed, the processor 77 directs the graphical display 32 to display the most recently selected capture-to destination (block 108). The processor 77 then inquires as to whether the left arrow button 36 or the right arrow button 38 is pressed (block 110). If either button is pressed the processor 77 instructs the graphical display 32 to display the previous or next capture-to destination from the preprogrammed list of destinations as indicated in block 112, and the processor 77 continues to check for further input from the operator panel 30 (block 110). If neither the left arrow button 36 or the right arrow button 38 is pressed, the processor 77 determines whether the select button 39 is pressed (block 113). If the select button 39 is pressed the processor 77 sets the capture-to destination to the destination currently displayed on the graphical display 32, as indicated in block 114. The process proceeds to block 116 where the graphical display 32 presents the message:

"Press Start Scan// button to begin"

The processor 77 then displays the default message, as shown in block 102. If the select button 39 is not pressed the processor simply displays the previously set capture-to destination (block 108).

If the destination selection button is not pressed the processor 77 determines whether the start capture button 57 is pressed, as shown at block 118. If the start capture button 57 is pressed, the processor 77 disables the destination selection button 55 (block 120) and causes the display of the currently selected capture-to destination on the graphical display 32 (block 122). The processor 77 must then decide, depending on the chosen capture-to destination, how to process and where to export or save the captured image. The processor 77 first inquires as to whether the capture-to destination is set to "Watermark" (block 124). If "Watermark" is the selected capture-to destination, the image capturer 85 captures the image (block 126), and the image processor 87 crops or otherwise processes the image as needed (block 128).

Although not shown in FIG. 6, the program may be adapted to allow the user to select the masked intensity of the image, such as 5%, to be used for the watermark. The processor 77 then stores the captured image in the background section 93 of the memory portion 91 of the memory module 79. Finally, the processor 77 enables the destination selection button 55 (block 132) and then resumes displaying the default message (block 102).

If a "Watermark" destination is not the selected capture-to destination, the processor 77 determines whether the capture-to destination is a "Header/Footer" destination, as shown in block 134 of FIG. 6A. If the capture-to destination is a "Header/Footer" destination, the image capturer 85 attains the header and footer section from the provided image, for example, the top one inch and bottom one inch of the image (block 136). Although not shown in FIG. 6A, the program may be adapted to allow the user to select the amount of the image to be used for the header and footer sections. Since only the header and footer of the provided image will be reproduced on subsequent output, only the header and footer sections of the provided image need to be captured. It would also be possible to capture the entire image and process it later on to obtain the header and footer sections. The captured image is then stored in the background section 93 of the memory portion 91 of the memory module 79 (block 138). Generally, images associated with a function other than the "Watermark" destination are stored at full or 100% intensity. Finally, the processor 77 enables the destination selection button 55 (block 132), and returns to displaying the default message (block 102).

If a "Header/Footer" destination is not the selected capture-to destination, the processor 77 determines whether a "Border/Frame" destination is the selected capture-to destination (block 140). If the selected capture-to destination is a "Border/Frame" destination, the image capturer 85 acquires the circumference of the image, for example the top one inch, bottom one inch, left one inch, and right one inch of the presented image (block 142). Since only a border or frame of the provided image will be added to future output, only the area corresponding to that area needs to be captured and retained. Again, although not shown in FIG. 6A, the program may be adapted to allow the user to select the amount of the image to be used for the border/frame sections. The processor 77 then stores the captured image in the background section 93 of the memory portion 91 of the memory module 79 (block 144). Finally, the processor 77 enables the destination selection button 55 (block 132), and returns to displaying the default message (block 102). One use for the "Border/Frame" feature is to scan a return address to be used in printing information on an envelope.

If a "Border/Frame" destination is not the selected capture-to destination, the processor 77 inquires as to whether a "Fax/Coversheet" destination is the selected capture-to destination (block 146). If a "Fax Coversheet" destination is the selected capture-to destination, the processor 77 instructs the image capturer 85 to secure the upper portion, for example the upper 33%, of the imported image (block 148). Only the upper section needs to be attained and saved since it will be used as a fax coversheet added with upcoming output. Next, the processor 77 enables the destination selection button 55 (block 132), and displays the default message (block 102).

Finally, if a "Fax Coversheet" destination is not the selected capture-to destination, it is assumed that the captured image will not be processed and stored in the background section 93 of the memory portion 91 of the memory module 79 of the multi-function device 20. The processor 77, however, must first check if the multi-function device 20 is attached to a workstation 12 or a device with an appropriate interface (block 152). If no connection is available, the message "Computer // not connected >"

will be displayed on the graphical display 32 (block 158), and the processor 77 will enable the destination selection button 55 (block 132) and again display the default message (block 102). If the multi-function device 20 is connected to a workstation 12 or a device capable of interfacing to a workstation, the captured image, captured by the image capturer 85 at block 154, will be stored or exported to the specified capture-to destination as shown in block 156. After storing the image, the processor 77 will enable the destination selection button 55 (block 132) and return to block 102 where the processor 77 displays the default message again (block 102).

The capture-to destinations where the multi-function device 20 stores and uses the captured image as background indicia for forthcoming output are not limited to the ones presented. Other destination formats may be created and added as needed.

Figure 7:
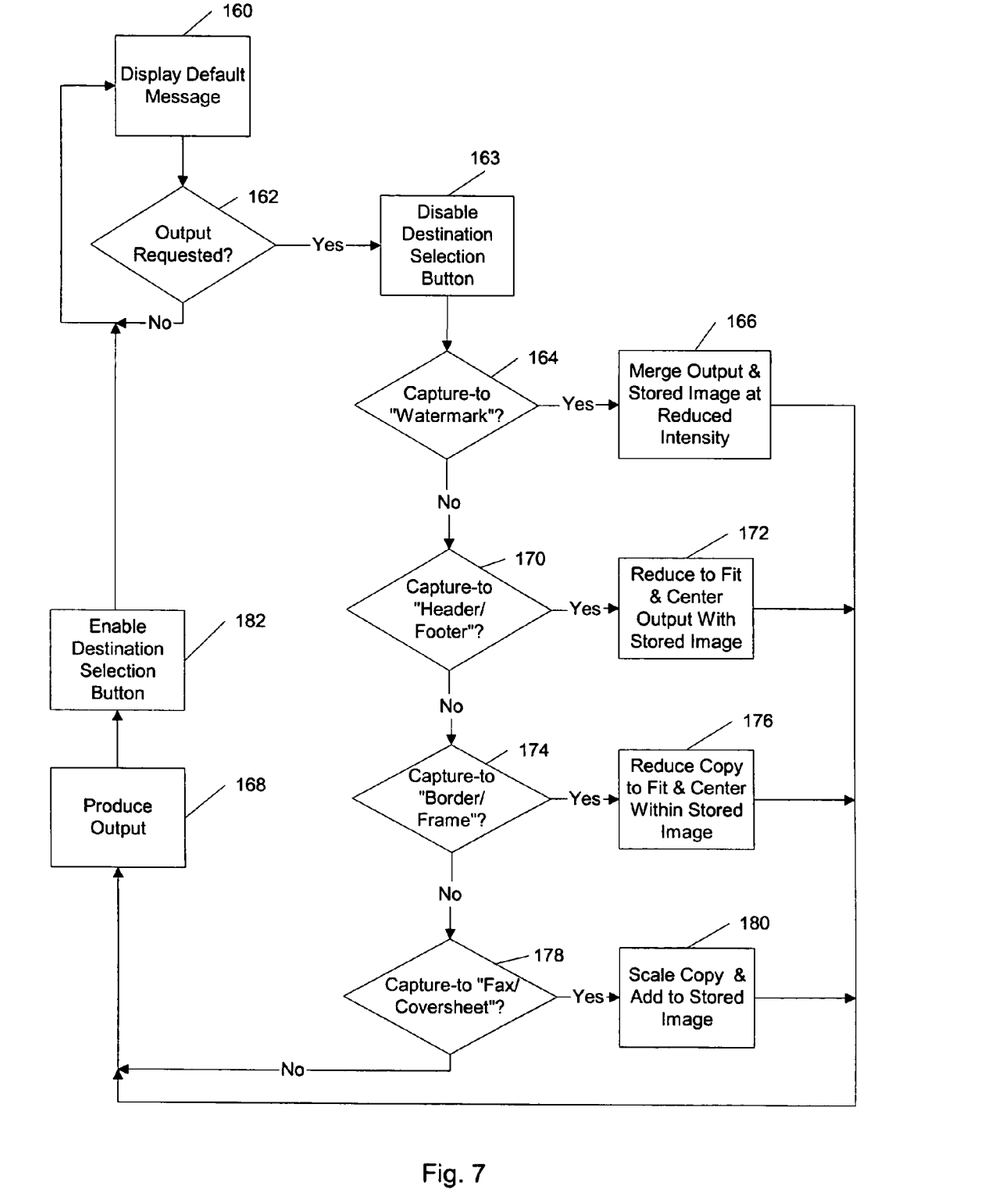
FIG. 7 is a flow chart displaying a process of producing output including a background image captured by the device.

Referring now to FIG. 7, the process for producing output commences with a start block 160. The graphical display 32 displays a default message and the processor 77 awaits instruction either from the operator panel 30, the workstation 12, or any other device with an appropriate interface. The processor 77 continually checks for output requests, as shown at block 162. If no request is found, the processor 77 continues to display the default message on the graphical display 32 (block 160). If a request is found, the processor 77 first disables the destination selection button 55 (block 163) and proceeds to determine if background indicia have been specified for all output. At block 164 the processor 77 examines the selected capture-to destination and first checks if it is set to a "Watermark" destination. If the selected capture-to destination is a "Watermark" destination the processor 77 merges the requested output with a lower masked intensity version, such as 10%, of the image stored in the background section 93 of the memory portion 91 of the memory module 79 (block 166). The reduced intensity allows the stored image to appear as a watermark embedded with the requested output that is created as shown in block 168.

Alternatively at block 170, the processor 77 queries whether the selected capture-to destination is set to a "Header/Footer" destination. If the processor 77 finds the selected capture-destination to be set to a "Header/Footer" destination, the output is reduced to fit and centered within the stored "Header/Footer" image (block 172). The device 20, as shown at block 168, then produces the combined output.

If the selected capture-to destination is not set to a "Watermark" or a "Header/Footer" destination, the processor 77 checks if the capture-to destination is set to a "Border/Frame" destination (block 174). If this is the case, the sent output is reduced to fit, centered, within the stored "Border/Frame" image (block 176). The final output is then produced at block 168.

If the capture-to destination has not been set to any of the previously checked destinations, the processor 77 checks if the capture-to destination is set to a "Fax/Coversheet" destination (block 178). If the capture-to destination is indeed set to a "Fax/Coversheet" destination the processor 77 scales the requested output to 66% the original size and merges it, centered, below the "Fax/Coversheet" indicia stored in the background section 93 of the memory portion 91 of the memory module 79 (block 180). The "Fax/Coversheet" image combined with the original output is then created at block 168. Although 33% and 66% of the page size are exemplary embodiments for providing the facsimile transmission information and the information to be faxed, respectively, other proportions may be used. For example, the typical transmission information found on a fax coversheet, such as sender and recipient names, telephone numbers, facsimile numbers, date and number of pages can be placed in a header or footer or in a region smaller than 33% of the height of the page with the other information to be sent being correspondingly scaled to fit on the remainder of the page.

Finally, if no matching capture-to destination has been discovered of those previously listed, it is assumed that no background image is to be combined or merged with the desired output. The output is simply produced at block 168.

After any output is produced, with background images or without, the processor 77 enables the destination selection button 55 (block 182) and returns to displaying the default message (block 160).

Once a capture-to destination requiring the addition of background indicia has been set, all future output may contain, in addition to the original data, the stored background in a format designated by the specific capture-to destination value, until either a settings timeout occurs, which cancels all non-default programmed settings, or a capture-to destination is chosen which does not require the addition of a stored background image to all outputs. A "cancel background" capture-to destination may also be added to the list of possible destinations that the user can select by using the destination selection button 55. The multi-function device 20 may also have a reset option which would clear any saved background images.

In another embodiment of the invention, a set of peripherals, not housed in the same device, could be configured to perform similar capture-to functionality otherwise provided by the multi-function device 20. The scanner 18 and the printer 19 illustrated in FIG. 1 could be organized in such a way that the printer 19 could receive and store images captured by the scanner 18, and the printer 19 could use the saved images as background indicia. Any device that can output images capable of being captured by another device, such as a workstation or a digital camera, could replace the scanner 18. Any device that creates output and is capable of holding received data in memory could replace the printer 19, including a fax machine and a photocopier.

The functionality to create, process, and use background images in both the stand-alone multifunction device 20 embodiment and the embodiment utilizing the coupling of a number of single-operation devices, such as the scanner 18 and the printer 19, configured to operate like the multifunction device 20, could be implemented in software, hardware, or a combination thereof.

Various features and advantages of the invention are set forth in the following claims.

The invention claimed is:

1. An image capture and printing device for creating a scanned image of an original image, the device comprising:
   a user interface configured to present a plurality of capture-to functions and to receive input from a user indicating a selection of at least one of the plurality of capture-to functions;
   an image capturer configured to capture a first image from only a portion of the original image, where the size, shape, or intensity of the first image, or a combination of the first image's size, shape, and intensity is based upon the selected capture-to function, and the portion of the original image captured is based upon the selected capture-to function; and
   a print engine configured to print the first image as a background layer in a copy.

2. The device of claim 1, wherein one of the plurality of capture-to functions is a capture-to watermark function.

3. The device of claim 2, wherein the first image is stored at a reduced intensity.

4. The device of claim 3, wherein the first image is stored at a user determined reduced intensity.

5. The device of claim 2, wherein the first image is stored at about 10% intensity.

6. The device of claim 2, wherein the first image is printed as a background layer at a masked intensity.

7. The device of claim 1, wherein one of the plurality of capture-to functions is a capture-to header/footer function.

8. The device of claim 7, wherein the capture-to header/footer function captures a top portion and a bottom portion of the original image without the device analyzing content of the original image.

9. The device of claim 8, wherein the top and bottom portion captured measures about 1 inch.

10. The device of claim 8, wherein the size of top and bottom portions captured from the original image is user selected.

11. The device of claim 1, wherein one of the plurality of capture-to functions is a capture-to border/frame function.

12. The device of claim 11, wherein the capture-to border/frame function captures a subset of top, bottom, left, and right portions of the original image without the device analyzing content of the original image.

13. The device of claim 12, wherein the top, bottom, left, and right portion of the original image captured measures about 1 inch.

14. The device of claim 12, wherein the size of the portion of the original image captured is user selected.

15. The device of claim 1, wherein one of the plurality of capture-to functions is a capture-to fax coversheet function.

16. The device of claim 15, wherein the scan to fax coversheet function captures the upper portion of the original image.

17. The device of claim 16, wherein the upper portion captured measures about 33% of the original image.

18. The device of claim 15, wherein the captured image is stored at about 100% intensity of the original image.

19. The device of claim 1, wherein the device is a standalone device.

20. A method of producing a background layer of an image, the method comprising:
    providing a plurality of capture-to functions via a user interface;
    receiving input from a user indicating a selection of at least one of the plurality of capture-to functions;
    capturing a first image from only a portion of an original image based upon the selection of the user;
    processing a combination of the first image's size, shape, and intensity, based upon the selection of the user, to produce a processed image; and
    printing the processed image in a background layer of a second image.

21. The method of claim 20, wherein the step of capturing a first image further comprises storing an image that represents only a portion of an item being imaged.

22. The method of claim 21, further comprising the step of cropping.

23. The method of claim 20, further comprising the step of placing the first image as a background layer at a masked intensity.

24. The method of claim 23, wherein the masked intensity is about 10% of an original image.

25. The method of claim 23, wherein the masked intensity is user determined.

26. The method of claim 20, wherein the step of capturing a first image further comprises storing an image that is configured as a header/footer 27. The method of claim 26, wherein capturing the first image further comprises scanning the top and bottom portion of of the original image without regard to content of the original image.

28. The method of claim 27, wherein the top and bottom portion each measure about 1 inch in height.

29. The method of claim 27, wherein the size of the top and bottom portions are user determined.

30. The method of claim 20, wherein the step of capturing a first image further comprises capturing only an image of a border of the original image.

31. The method of claim 30, wherein the first image capturing comprises scanning the top, bottom, left, and right portions of the original image.

32. of claim 31, wherein each of the top, bottom, left, and right portions measure about 1 inch.

33. The method of claim 31, wherein the size of each of the top, bottom, left and right portions is user determined.

34. The method of claim 20, wherein the first image capturing comprises scanning only an upper portion of the original image.

35. The method of claim 34, wherein the upper portion measures about 33% of a height of the imaged item.

36. The method of claim 34, further comprising processing the second image to adjust its size or shape.

37. A method, comprising
receiving a first image;
receiving from a user a selection of a capture mode;
capturing only a portion of the first image based upon the capture mode selected, the capturing occurring without regard to content of the first image; and
placing the captured portion of the first image as a background layer in a second image.

38. The method of claim 37, wherein the portion of the first image captured comprises only a border portion of the first image.

* * * * *